United States Patent [19]
Staley et al.

[11] 3,901,319
[45] Aug. 26, 1975

[54] SEALING A TUBE IN A BORE

[75] Inventors: John George Staley, Mansfield; Robert Aldred, Newark, both of England

[73] Assignee: Coal Industry (Patents) Ltd., London, England

[22] Filed: Oct. 29, 1974

[21] Appl. No.: 518,715

[30] Foreign Application Priority Data
Nov. 2, 1973 United Kingdom............... 50986/73

[52] U.S. Cl. ................ 166/286; 166/162; 166/295
[51] Int. Cl.².................. E21B 33/13; E21B 33/132
[58] Field of Search ............ 166/286, 295, 162, 165

[56] References Cited
UNITED STATES PATENTS
2,064,336  12/1936  Bates ................................ 166/165
2,089,479  8/1937  Herbsman.......................... 166/165
3,190,373  6/1965  Weathersby ....................... 166/286

*Primary Examiner*—James A. Leppink
*Attorney, Agent, or Firm*—James C. Wray

[57] ABSTRACT

A tubular standpipe is sealed in a bore in rock strata by first inserting, to the end of the bore, a closed frangible tube having a resin mixture sealed in it. The standpipe is inserted in the bore and pushed against the tube until it breaks. The standpipe then mixes the resin and is forced up the bore pushing the resin between the standpipe and the bore and into any small cracks in the bore. When the resin is set the standpipe is held firm and a drill is passed through it to drill through into the strata.

8 Claims, 1 Drawing Figure

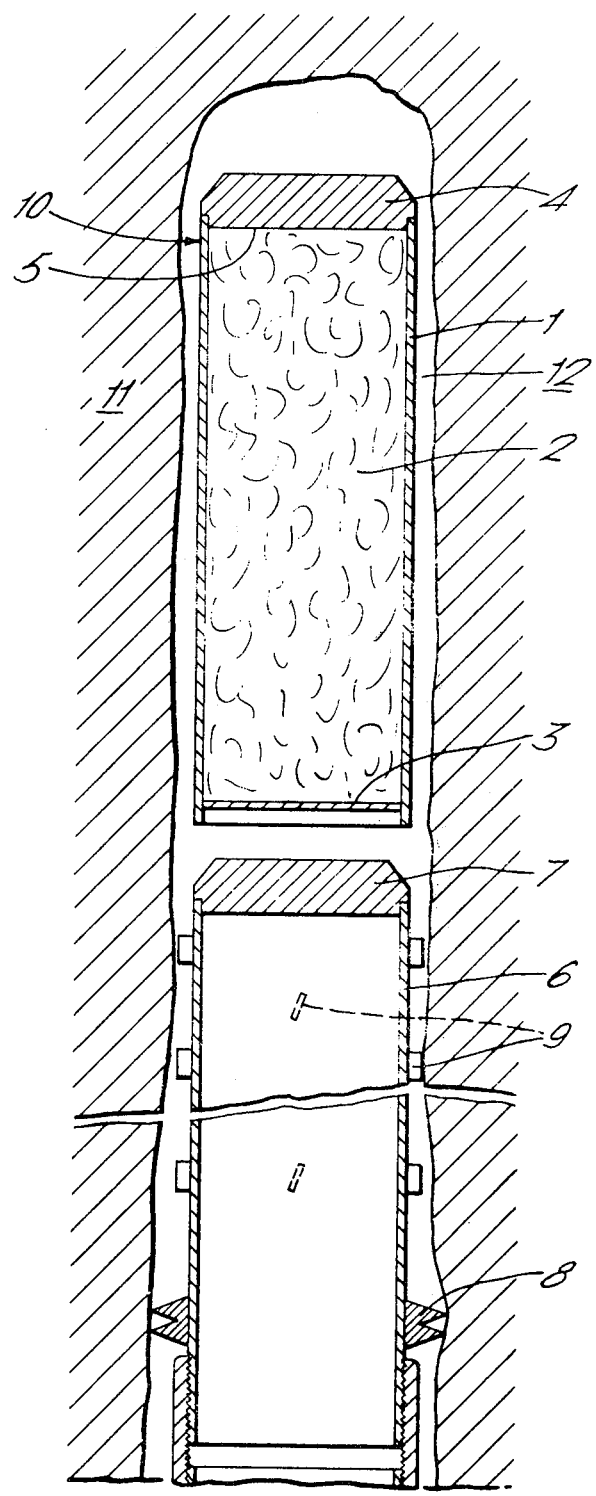

SEALING A TUBE IN A BORE

This invention relates to a method of sealing a tube in a bore and to a seal formed by this method.

This invention has a particular application to mining where tubular standpipes are inserted in bores in strata to drain firedamp or other gases. The application is not, however, limited to drainage and can be used in any application where a good seal is needed between the innermost end of the tube and the base.

In any firedamp drainage system it is a standard method to drill a hole, usually about 30 ft in length, into the strata and then to insert a tube into the bore of the hole, seal the tube in the hole and then continue to drill through the tube into the gassy area to be drained. The tube is chosen so that its outer diameter is a close fit with the wall of the bore but not so close as to make insertion difficult. There is consequently always some space between the outer wall of the tube and the wall of the bore. This space allows air to flow into the drainage area and interfere with the gas being drained. In order to avoid this interference it is necessary to seal the tube to the wall of the bore to prevent air flow around the outside of the tube. To date this seal has been made, generally, in one of three ways. One way is to grout cement in the space in the bore between the tube and the bore by forcing the cement up a pipe in the tube, which pipe has a turned over outlet at the innermost end of the tube and feeds the grout into the space. The pipe is withdrawn after the grouting material has been pushed into position and the cement left to set. This method has the disadvantage that since it takes from four to twenty four hours for the cement to set, completion of the drainage operation is delayed for this period.

A second way is to use a proprietary tape which is wrapped in the form of a cone around the tube and situated in the bore near its outer end. When the drill is passed through the tube for subsequent 'drilling-on' past the innermost end of the tube drill chippings fall back and are retained in the space between the tube and the bore. In situations where sandstone exists above the tube the sandstone chippings dry out and the seal consequently loses its efficiency and air leaks up the outside of the tube.

The third method involves placing a rubber collar around the upper and lower ends of the tube and deforming the collar into compression with the wall of the bore when forcing the tube into the bore. This method is the most effective of all three methods referred to but it has the disadvantage of being relatively expensive. Some air can also filter around the seals through minute cracks and fissures in the rock in the area of the seals.

In our co-pending British Pat. application No. 36553/72 we have disclosed an improved method of sealing a tube in a bore which substantially overcomes the disadvantages of the above three recited methods. In that application we describe a method of sealing which comprises the steps of filling at least part of the tube with a resin material, inserting the tube in the bore and forcing the resin material from the innermost end of the tube into the space between the wall of the bore and the outer wall of the tube.

It is an object of the present invention to provide an alternative to this method, but one which is equally effective.

According to the present invention a method of sealing a tube in a bore comprises the steps of inserting a frangible tube containing a sealing material into the bore, forcing the tube up the bore to the innermost end thereof, applying pressure to the tube to cause it to burst and passing a tubular standpipe up to the end of the bore with the sealing material filling the gap between the standpipe and the end of the bore.

The sealing material is preferably a resin contained in the tube in two parts; the stand-pipe is therefore best rotated when being moved toward the innermost end of the bore to mix the resin and cause it to set. The sealing material may conveniently be in thixotropic form with a catalyst suitably dispersed throughout to facilitate mixing.

The standpipe is preferably provided with an external sealing collar capable of sliding over the outside of the standpipe to act as a seal to keep the sealing material at the end of the borehole and to assist in the extrusion of some of the sealing material into fissures in the strata.

Preferably the end of the standpipe which is arranged in line to engage the tube is provided with a shaped bursting plug, and vanes welded to the outside to assist in mixing the sealing material.

The invention also includes a frangible tube filled with a sealing material and sealed at one end with a plug and at the other end with a frangible end set a short distance within the tube.

In order that the invention may be readily understood one example of sealing a standpipe into a bore using a tube in accordance with the invention will now be described with reference to the accompanying drawing which shows a sectional side view of a tube and the end of an adjacent standpipe.

It is assumed that the invention is applied in a coalmine to drain methane from a gassy strata. The drain is constructed by drilling a bore hole 10 of about 30 feet in length from an underground roadway into the strata 11 and securing a standpipe in the strata, and then drilling along through the standpipe into the gassy strata so that methane is drawn by pumping down the standpipe.

In order to secure the standpipe in the bore hole the innermost end of the standpipe is secured by a sealing mixture to the walls of the bore in such a manner as air cannot be drawn around the outside of the standpipe through minor fissures in the rock adjacent to the end.

The drawing shows the method and apparatus for sealing a tube in a well bore.

Referring now to the drawing, a tube 1 has its casing made of a frangible material, in this case asbestos having a ¼ inch wall thickness, is filled with a resin sealing material 2 having catalyst hardener within it but separated from it by a suitable barrier. A frangible end 3 within the bore of tube 1 closes the tube 1 at its lower end. The upper end of tube 1 is closed by a cement plug 4 which is externally shaped to slide easily within a bore. The inside surface of plug 4 is coated at 5 with a catalyst for the resin 2 so that any resin left on the plug after use sets quickly and does not remain plastic to interfere with subsequent drilling operations.

In use, a 30 feet bore hole 10 is drilled from an underground tunnel and the drill withdrawn. The tube 1 is then passed into the bore with the cement plug 4 leading. A standpipe 6, part of which is shown in the FIGURE, is used to push the tube 1 into the bore. The standpipe is in sections which are joined together as they are fed into the bore. The leading end of the standpipe 6 is capped by a shaped cement bursting plug 7 and a flexible collar 8 is fitted around the standpipe at its lower end.

The standpipe 6 pushes the tube 1 up to the end of the bore. Hydraulic pressure is then applied to the end of the standpipe 6 forcing the bursting pipe 7 into the tube 1 and against the frangible end 3. The continued pressure causes the tube 1 to shatter as the bursting plug 7 is urged upwards forcing the sealing material to mix with the catalyst and to enter the gap 12 between the outside of the standpipe 6 and the wall of the bore 10. The collar 8 contains the sealant around the pipe. When the standpipe has been advanced to the end of the bore the pipe is rotated a few times to mix the sealing material fully with the aid of vanes 9.

After the sealing material has set further drilling takes place by passing a drill up through the standpipe and then first drilling through the cement plugs 4 and 7 at the end of the bore (and any sealant which has set at the end) and then on into the strata.

The invention enables an effective seal of the standpipe to be made within the bore and if a fast setting resin mixture is used for the material 2 the seal can be completed within 10 minutes.

The tube 1 is filled at a factory and delivered to the mine ready for use. Thus a consistent mix is achieved and no on-site mixing is necessary. Instead of an asbestos tube one of a brittle plastics materials such as a sand based plastic may be used. A typical bore diameter for the tube is 3 inches.

We claim:

1. A method of sealing a tube in a bore comprising the steps of inserting a frangible tube containing a sealing material into a bore, forcing the tube up the bore to the innermost end thereof, applying pressure to the tube to cause it to burst and passing a closed tubular standpipe up to the end of the bore and forcing the sealing material between the bore and the standpipe.

2. A method according to claim 1 and including within the tube a two part resin as the sealing material, the two parts being separated from each other until the tube is burst.

3. A method according to claim 2 and including mixing the said two parts with means secured to the standpipe.

4. A method according to claim 2 and including mixing a catalyst in with the said parts.

5. A method according to claim 1 and including confining the said sealing material to an area around the innermost end of the standpipe by providing closure means on the standpipe, the closure means being adapted to extend between the standpipe and the base a short distance from the end of the bore.

6. A method according to claim 1 and including the step of drilling through a closure device on the standpipe after the standpipe has been sealed in the bore.

7. A tube for use with the method of claim 1 in which the tube comprises a frangible casing, a sealing member at one end of the casing, a bursting member at the other end of the casing, the bursting member being set into the tube by a short distance, and sealing material within the tube.

8. A tube according to claim 7 in which the sealing material is a thixotropic resin.

* * * * *